(12) United States Patent
Mitsui et al.

(10) Patent No.: US 9,316,280 B2
(45) Date of Patent: Apr. 19, 2016

(54) SPRING UNIT AND SLIDE MECHANISM (71) Applicant: MITSUBISHI STEEL MFG. CO., LTD., Tokyo (JP)

(72) Inventors: Yasuhiro Mitsui, Chiba (JP); Toru Hirokane, Chiba (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 0 days.

(21) Appl. No.: 14/375,167

(22) PCT Filed: Jan. 24, 2013

(86) PCT No.: PCT/JP2013/051459
§ 371 (c)(1),
(2) Date: Jul. 29, 2014

(87) PCT Pub. No.: WO2013/115059
PCT Pub. Date: Aug. 8, 2013

(65) Prior Publication Data
US 2014/0373655 A1 Dec. 25, 2014

(30) Foreign Application Priority Data

Jan. 31, 2012 (JP) ................................ 2012-018742

(51) Int. Cl.
*F16F 3/10* (2006.01)
*F16F 3/02* (2006.01)
*H04M 1/02* (2006.01)

(52) U.S. Cl.
CPC ... *F16F 3/10* (2013.01); *F16F 3/02* (2013.01); *H04M 1/0237* (2013.01); *Y10T 74/18904* (2015.01)

(58) Field of Classification Search
USPC .................. 267/47, 149, 152, 158, 159, 165; 455/575.4; 361/679.01, 679.02; 174/51, 53
See application file for complete search history.

(56) References Cited

U.S. PATENT DOCUMENTS 6,461,455 B1 * 10/2002 Meatto et al. .................... 156/64
8,383,936 B2 * 2/2013 Duan et al. ....................... 174/51
9,004,464 B2 * 4/2015 Hazama et al. .................. 267/47
(Continued)

FOREIGN PATENT DOCUMENTS

JP 2009-133495 6/2009
JP 3161848 U 8/2010
(Continued)

OTHER PUBLICATIONS

International Search Report mailed on Apr. 9, 2013.

*Primary Examiner* — Christopher Schwartz
(74) *Attorney, Agent, or Firm* — Ipusa, PLLC (57) ABSTRACT

A spring unit including a resin spring that is made of a resin, has a structure having a single beam, and has a resin spring curved part between a pair of resin spring end parts; and a metallic spring that is made of a metallic wire and has a metallic spring curved part between a pair of metallic spring end parts, wherein each of the metallic spring end parts is attached to each of the resin spring end parts, wherein, in a state where each of the metallic spring end parts is attached to each of the resin spring end parts, the resin spring and the metallic spring are positioned on a same plane and are mutually separated at parts other than the resin spring end parts and the metallic spring end parts.

6 Claims, 7 Drawing Sheets

(56) References Cited

U.S. PATENT DOCUMENTS

| | | | |
|---|---|---|---|
| 9,022,367 B2 * | 5/2015 | Katsuta | 267/47 |
| 2009/0069058 A1 * | 3/2009 | Taschke | 455/575.4 |
| 2010/0214726 A1 * | 8/2010 | Kubota | 361/679.01 |
| 2010/0237550 A1 * | 9/2010 | Kubota | 267/159 |
| 2011/0023637 A1 * | 2/2011 | Ogatsu | 74/100.1 |
| 2011/0095461 A1 * | 4/2011 | Ding et al. | 267/165 |
| 2011/0287817 A1 * | 11/2011 | Liang | 455/575.1 |
| 2012/0182672 A1 * | 7/2012 | Duan et al. | 361/679.01 |
| 2015/0030267 A1 * | 1/2015 | Mitsui et al. | 384/37 |

FOREIGN PATENT DOCUMENTS

| | | |
|---|---|---|
| JP | 2011-244430 | 12/2011 |
| KR | 10-2007-0077542 | 7/2007 |
| WO | 2012/018025 | 2/2012 |
| WO | 2012/026598 | 3/2012 |

* cited by examiner

SPRING UNIT AND SLIDE MECHANISM

TECHNICAL FIELD

The present invention generally relates to a spring unit and a sliding mechanism, and more specifically, to a thinned spring unit and a thinned sliding mechanism.

BACKGROUND ART

For example, an exemplary electronic apparatus or a game machine includes a fixed casing having operation keys and a movable casing which has a liquid crystal display device or the like and is slidable relative to the fixed casing. A sliding mechanism may be installed in such an electronic apparatus to enable a slide motion of the movable casing relative to the fixed casing.

A spring unit is installed inside the sliding mechanism applied to this electronic apparatus. This sliding mechanism biases the movable casing toward a closing direction until an operator moves the movable casing to a predetermined position relative to the fixed casing, and biases the movable casing toward an opening direction after the operator moves the movable casing to a position equal to or farther than the predetermined position relative to the fixed casing. Thus, it is possible to improve operability of the electronic apparatus.

Springs having various structures are used for the spring units. One of the spring units is structured to have multiple wire springs made of a metal (see Patent Document 1). According to the spring unit disclosed in Patent Document 1, multiple wire springs (three springs) are used and end parts of the multiple wire springs are connected to the casing of the electronic apparatus using a connecting member.

[Patent Document 1] Japanese Laid-open Patent Publication No. 2009-133495

DISCLOSURE OF THE INVENTION

Problems to be Solved by the Invention

However, there is a problem that the product cost of the spring unit in which only multiple metallic wires are installed increases. Further, there are problems that the metallic spring has less shape flexibility than the resin spring and that it is difficult to form a predetermined spring shape. Accordingly, embodiments of the present invention may provide a spring unit and a sliding mechanism that can improve the shape flexibility of the spring at low cost solving the problems discussed above.

Means for Solving Problems

According to a first aspect of the present invention, the problem is solved by a spring unit including a resin spring that is made of a resin, has a structure having a single beam, and has a resin spring curved part between a pair of resin spring end parts; and a metallic spring that is made of a metallic wire and has a metallic spring curved part between a pair of metallic spring end parts, wherein each of the metallic spring end parts is attached to each of the resin spring end parts, wherein, in a state where each of the metallic spring end parts is attached to each of the resin spring end parts, the resin spring and the metallic spring are positioned on a same plane and are mutually separated at parts other than the resin spring end parts and the metallic spring end parts.

Effect of the Invention

According to the embodiment of the present invention, it is possible to reduce the product cost and enhance the shape flexibility of the spring because a resin spring is included.

MODE FOR CARRYING OUT THE INVENTION

A description is given below, with reference to FIG. 1 through FIG. 10 of embodiments of the present invention.

Next, a description of embodiments of the present invention is given below with reference to figures.

Figure 1:
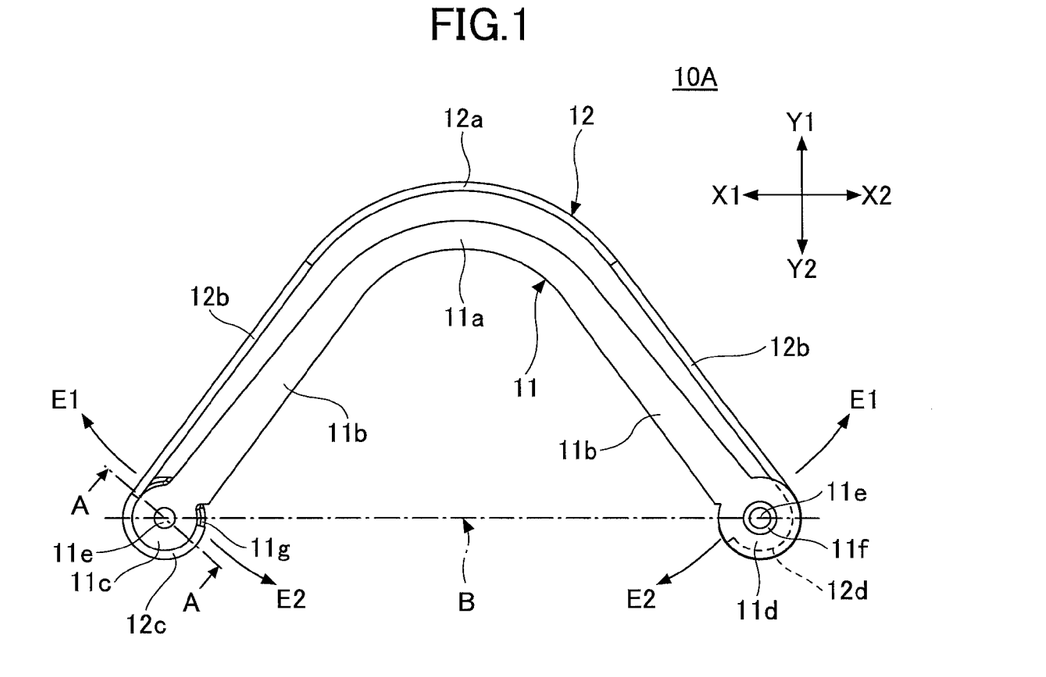
FIG. 1 is a plan view of a spring unit of a first embodiment.

FIG. 1 illustrates a spring unit 10A of a first embodiment of the present invention. The spring unit 10A of the first embodiment has a structure of including one resin spring 11 and one metallic spring 12. The spring unit 10A is applied to a sliding mechanism 20A (see FIGS. 3 and 4), which is installed in an electronic apparatus such as a portable phone or a game machine, as an actuator.

At first, the resin spring 11 is described.

The resin spring 11 is formed by integrally molding an elastically deformable resin. The resin spring 11 includes a pair of end parts 11c and 11d (the end part 11c on the side in the direction of X1 in FIG. 1 and the end part 11d on the side in the direction of X2 in FIG. 1) and a curved part 11a at a substantially center position between the end parts 11c and 11d. An extending part 11b is formed between the curved part 11a and the end part 11c, and another extending part 11b is formed between the curved part 11a and the end part 11d. Each of the extending parts 11b is shaped like a straight line. Therefore, the resin spring 11 is shaped substantially like an inverted letter V.

Further, the resin spring 11 has a structure having a single beam. Here, the structure having the single beam has no hole between the end part 11c and the other end part 11d so as to form a single beam.

Within the embodiment, cross-sectional areas of the resin spring 11 taken across its longitudinal direction between the pair of end parts 11c and 11d are set to be substantially the same area. However, in order to adjust the spring property of the resin spring 11, the cross-sectional areas can be appropriately changed.

Figure 2:
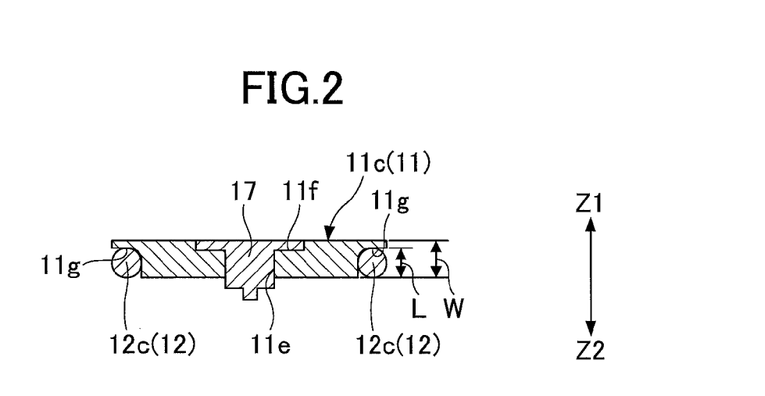
FIG. 2 is a cross-sectional view taken along a line A-A of FIG. 1.

FIG. 2 is a cross-sectional view of the end part 11c taken along a line A-A. A pin insertion hole 11e is formed at a center portion of the end part 11c. A pin 17 for attaching the spring unit 10A to a base plate 21A or a slide plate 20A of a sliding mechanism 20A described below is inserted into the pin insertion hole 11e.

A step 11f for the pin for accommodating a head portion of the pin 17 is formed at one end part of the pin insertion hole 11e on a side in the direction of Z1. Thus, the head of the pin 17 is formed so as not to protrude from the surface of the end part 11c so that the spring unit 10A is thinned.

An attaching flange 11g is formed in an outer peripheral portion of the end part 11c. The attaching flange 11g is a part where the end part 12c of the metallic spring 12 described below is attached. The end part 12c of the metallic spring 12 is winded around the attaching flange 11g so as to be attached to the attaching flange 11g.

The other end part 11d has the same structure as that of the end part 11c while the up and down directions (the directions Z1 and Z2) are inverted from FIG. 2.

Next, the metallic spring 12 is described.

The metallic spring 12 is a wire spring obtained by shaping spring material such as spring steel. The metallic spring 12 includes a pair of end parts 12c and 12d (the end part 12c on the side in the direction of X1 in FIG. 1 and the end part 12d on the side in the direction of X2 in FIG. 1) and a curved part 12a between the end parts 12c and 12d. An extending part 12b is formed between the curved part 12a and the end part 12c, and another extending part 12b is formed between the curved part 12a and the end part 12d. Each of the extending parts 12b is shaped like a straight line. Therefore, the metallic spring 12 is shaped substantially like an inverted letter V as a whole.

A curvature factor of the curved part 12a of the metallic spring 12 and a curvature factor of the curved part 11a can be appropriately set. The curvature factors of the curved parts 11a and 12a may be the same curvature factors or different curvature factors.

The cross-sectional shape of the metallic spring 12 is circular in the embodiment (see FIG. 2). However, the cross-sectional shape of the metallic spring 12 is not limited thereto and may be other cross-sectional shapes such as a rectangular shape, a barrel shape, or an elliptical shape.

The spring unit 10A has a structure combining the one resin spring 11 described above and the one metallic spring 12 described above. The end parts 12c and 12d of the metallic spring 12 are attached to the attaching flanges 11g formed in the end parts 11c and 11d of the resin spring 11, respectively. The attaching flange 11g is formed at an outer peripheral position of each of the end parts 11c and 11d and is shaped like a ring whose center is at the center position of the pin insertion hole 11e.

The end parts 12c and 12d of the metallic spring 12 are winded around the attaching flange 11g by about 180° so as to be attached to the end parts 11c and 11d of the resin spring 11, respectively. Thus, the end parts 11c and 11d of the resin spring 11 are fixed to the end parts 12c and 12d of the metallic spring 12, respectively, so that the resin spring 11 is integrated with the metallic spring 12.

In a state where the resin spring 11 is integrated with the metallic spring 12, the resin spring 11 and the metallic spring 12 are separated at positions other than the end parts 11c, 12c, 11d, and 12d. With this, even if the spring unit 10A is displaced in directions designated by arrows E1 and E2 in FIG. 1 the resin spring 11 does not interfere with the metallic spring 12. Thus, stable spring force can be generated.

Further, provided that a side of the resin spring where the tip of the end part 12c faces the end part 11c and a side where the tip of the end part 12d faces the end part 11d are called an "inside", the metallic spring 12 is arranged on an "outside" opposite to the "inside" of the resin spring 11. Said differently, the metallic spring 12 is arranged on the side of the direction Y1 of the resin spring 11.

Further, in the spring unit 10A, the resin spring 11 and the metallic spring 12 are positioned on the same plane in a state that the resin spring 11 is integrated with the metallic spring 12. By this structure, the spring unit 10A is thinned.

Here, the same plane means a plane being orthogonal to the central axis of the pin insertion hole 11e and including a segment of a line connecting central positions of the pin insertion holes 11e (a dot chain line indicated by arrows A).

Further, in the spring unit 10A, the diameter of the cross-section of the metallic spring 12 indicated by the arrow L in FIG. 2 is smaller than the thickness indicated by the arrow W in FIG. 2 of the resin spring 11 (L<W). The end parts 12c and 12d of the metallic spring 12 are attached to the attaching flanges 11g formed in the end parts 11c and 11d of the resin spring 11, respectively, so as to be winded around the attaching flange 11g foamed in the end parts 11c and 11d of the resin spring 11.

The thicknesses of positions where the end parts 11c and 11d are attached to the end parts 12c and 12d is the same as the thicknesses of the end parts 11c and 11d of the resin spring 11. Therefore, the spring unit 10A can be thinned.

Further, the spring unit 10A differs from a conventional spring unit made of only a metallic wire in that a lightweight resin spring 11 is used as a part of the spring. Therefore, the weight of the spring unit 10A can be trimmed.

Further, because the spring unit 10A has a structure that the end parts 12c and 12d of the metallic spring 12 are directly attached to the end parts 11c and 11d of the resin spring 11, it is unnecessary to additionally provide a component to attach the end parts 11c, 11d, 12c, and 12d. With this, it is possible to reduce the number of components of the spring unit 10A and simplify an assembling process.

Further, the resin spring 11 and the metallic spring 12 are structured so as not to mutually interfere when the spring unit 10A is driven in the directions of the arrows E1 and E2. Therefore, the curved parts 11a and 12a and the extending parts 11b and 12b individually displace to prevent them from mutually interfering. Therefore, if the spring unit 10A is provided in the sliding mechanism 20A (see FIGS. 3 and 4), the springs 11 and 12 do not buckle to ensure a smooth movement of the slide plate 22A relative to the base plate 21A.

Next, described is the sliding mechanism 20A of the first embodiment of the present invention in which the spring unit 10A is installed.

Figure 3:
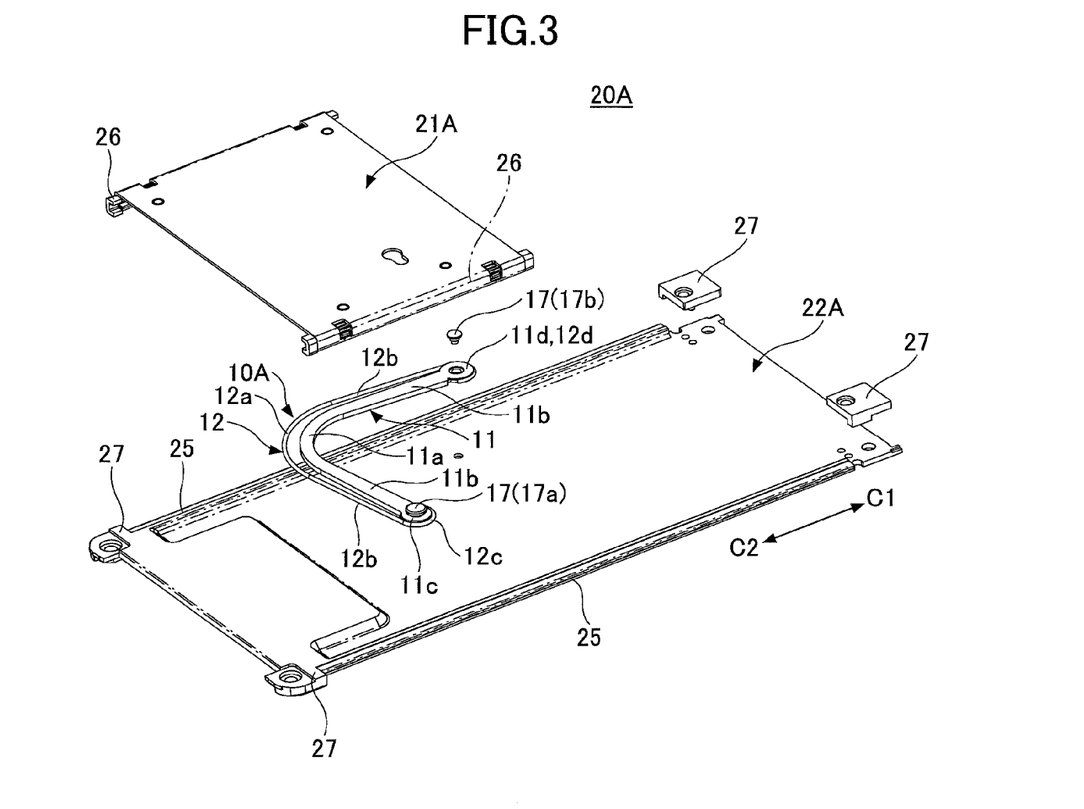
FIG. 3 is an exploded perspective view of the sliding mechanism of the first embodiment.
Figure 4:
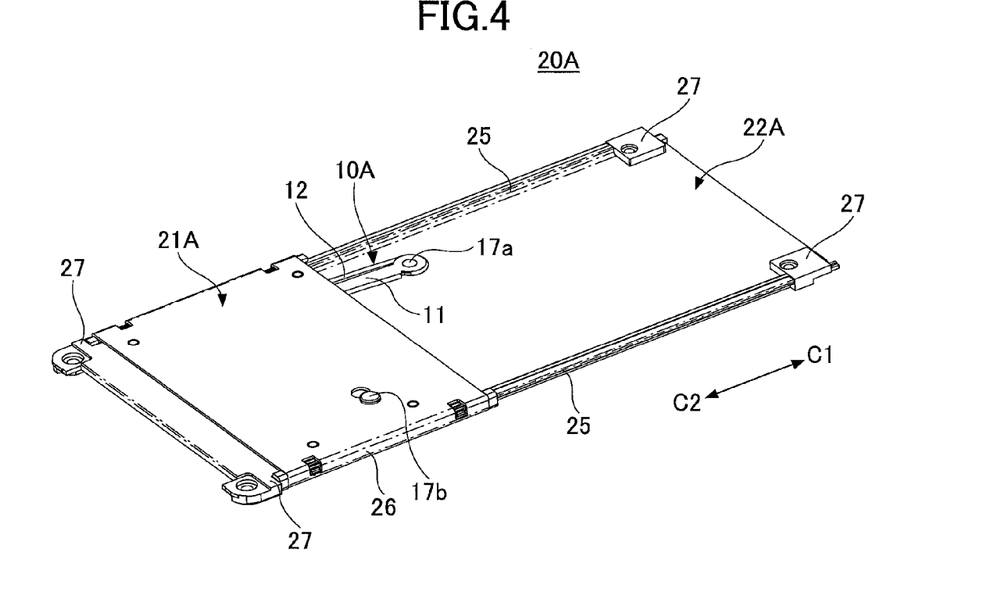
FIG. 4 is a perspective view of the sliding mechanism of the first embodiment.
Figure 5A:
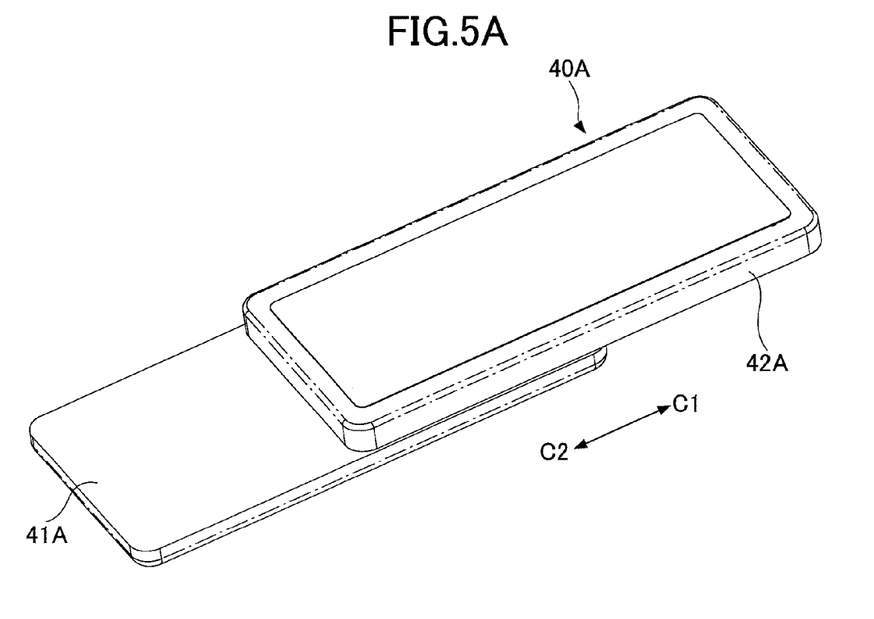
FIG. 5A is a perspective view of an electronic apparatus having the sliding mechanism of the first embodiment of the present invention.
Figure 5B:
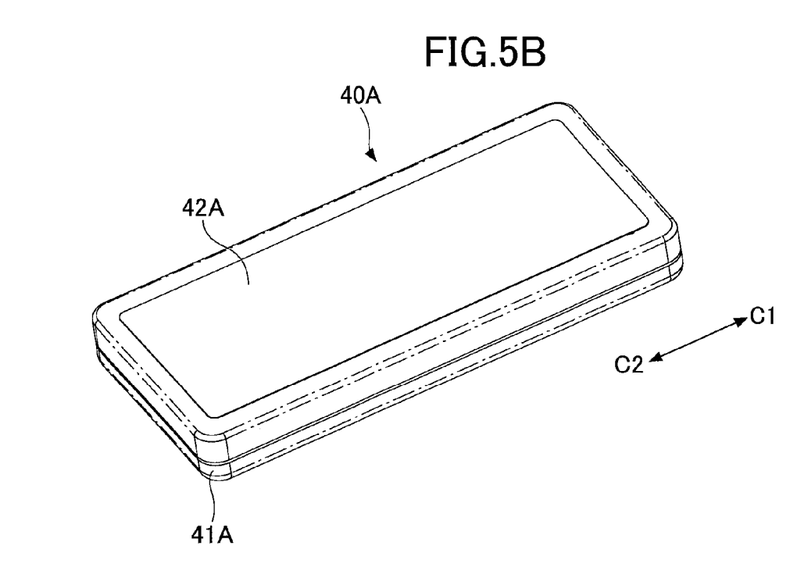
FIG. 5B is a perspective view of the electronic apparatus having the sliding mechanism of the first embodiment of the present invention.

FIG. 3 is an exploded perspective view of the sliding mechanism 20A in which the spring unit 10A is installed. FIG. 4 is a perspective view of the sliding mechanism 20A in which the spring unit 10A is installed. FIGS. 5A and 5B are a perspective view of an electronic apparatus 40A in which the sliding mechanism 20A is installed.

In summary, the sliding mechanism 20A is structured to include the base plate 21A, the slide plate 22A, the spring unit 10A, or the like. This sliding mechanism 20A can be applied to the electronic apparatus 40A such as a portable phone, in which a second casing 42A slides on the first casing 41A as illustrated in FIGS. 5A and 5B.

The base plate 21A is fixed to the first casing 41A on which various keys of the portable phone are arranged. The slide plate 22A is fixed to the second casing 42A in which a liquid crystal display device or the like is installed.

The guide member 26 is provided on both sides of the base plate 21A. The guide member 26 is formed so as to extend in directions of the arrows C1 and C2. Side edge parts 25 extending in the longitudinal direction on both sides of the slide plate 22A are structured to be slidably engaged with the guide member 26. With this, the slide plate 22A is structured to be slidable in the directions of C1 and C2 relative to the base plate 21A.

The end parts 11c and 12c of the spring unit 10A are attached to the base plate 21A so as to be rotatable by the pin 17 (17a). The other end parts 11d and 12d of the spring unit 10A are attached to the slide plate 22A so as to be rotatable by the pin 17 (17b). With this, the elastic force of the spring unit 10A affects a relationship between the base plate 21A and the slide plate 22A.

Further, a stopper 27 contacts the base plate 21A when the slide plate 22A moves to reach a terminal position in the direction C1 and a terminal position in the direction C2 so that a further movement of the slide plate 22A is regulated.

FIGS. 4 and 5A illustrate an opened state where the second casing 42A is opened relative to the first casing 41A. In the opened state, the slide plate 22A is slid along the direction C1 relative to the base plate 21A. In this opened state, the spring unit 10A functions to urge and move the elastic force to the slide plate 22A in the direction C1 relative to the base plate 21A.

When the second casing 42A is moved in the direction of the arrow C2 from the opened state, the distance between the pins 17 is gradually reduced to cause the end parts 11c and 12c to approach the end parts 11d and 12d. Accordingly, the angles of the curved portions 11a and 12a are reduced to cause elastic deformation in the resin spring 11 and the metallic spring 12. Thus, the elastic force is accumulated.

A state where the resin spring 11 and the metallic spring 12 of the spring unit 10A are contracted (deformed) the most is called an "intermediate state". While the slide plate 22A is changed from the opened state to the intermediate state, the elastic force generated by the spring unit 10A functions to move the slide plate 22A in the direction C1 relative to the base plate 21A. Therefore, if the movement of the slide plate 22A is stopped before the slide plate 22A reaches the intermediate state, the slide plate 22A returns to the opened state by the elastic force generated by the spring unit 10A.

Meanwhile, if the slide plate 22A is further moved in the direction C2 from the intermediate state, the direction of urging the slide plate 22A by the elastic force of the spring unit 10A is inverted. Therefore, the elastic force of the spring unit 10A functions in the direction of closing the slide plate 22A relative to the base plate (the direction C2 in FIGS. 4 and 5A).

Therefore, if the slide plate 22A is slid in the direction C2 beyond the position of the intermediate state, even if the slide operation is stopped, the elastic force generated by the spring unit 10A causes the slide plate 22A to automatically move so as to be in the closed state (the state illustrated in FIG. 5B). As described, the spring unit 10A functions as a so-called semi-automatic sliding mechanism. An operation of returning the slide plate 22A from the closed state to the opened state is inverse to the above slide operation.

Figure 7A:
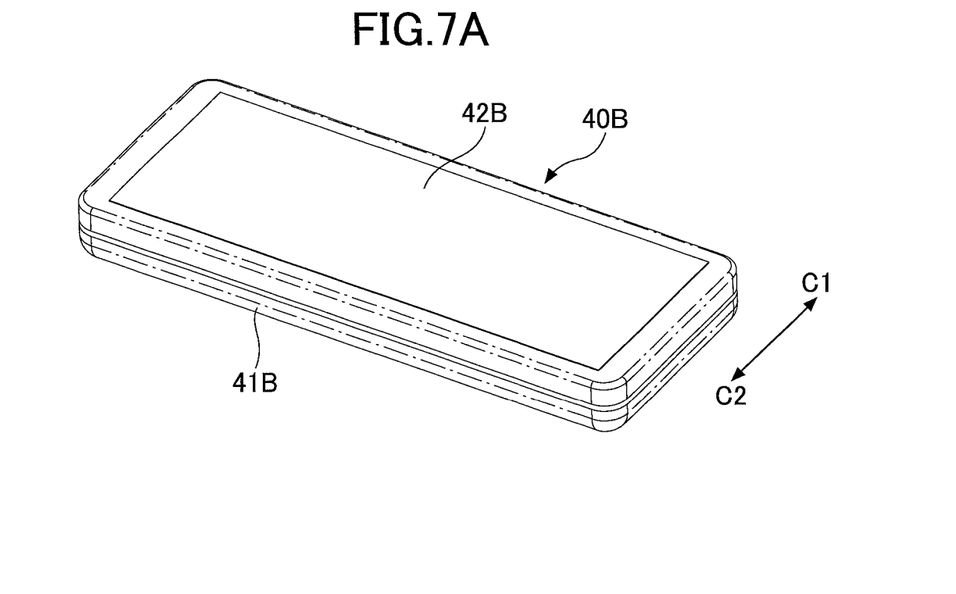
FIG. 7A is a perspective view of an electronic apparatus having the sliding mechanism of the second embodiment of the present invention.
Figure 7B:
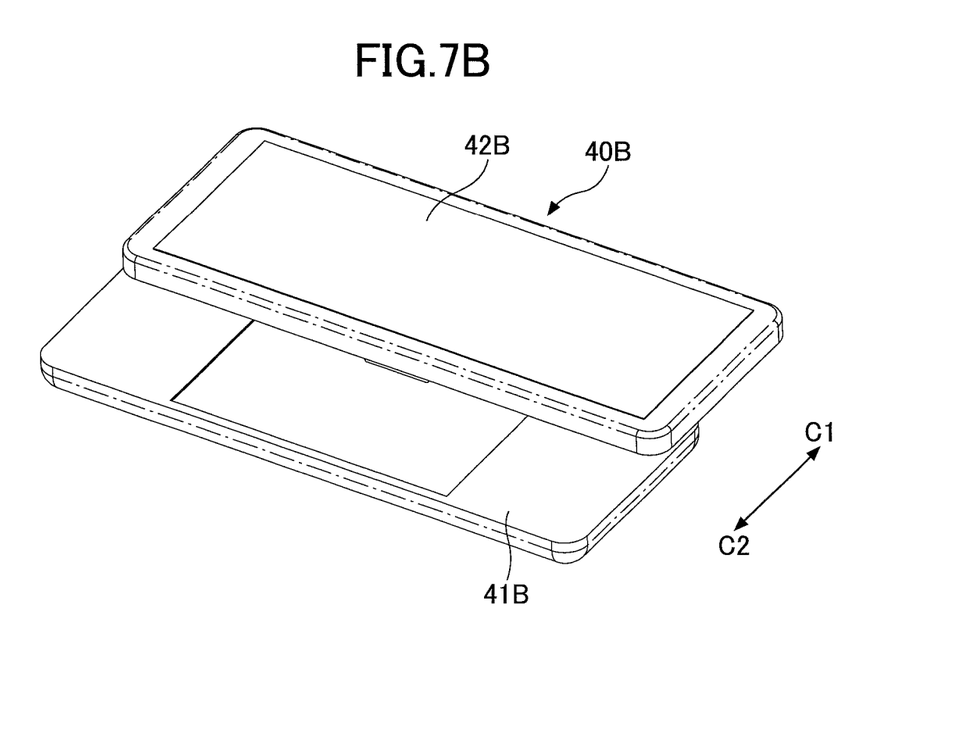
FIG. 7B is a perspective view of the electronic apparatus having the sliding mechanism of the second embodiment of the present invention.

Next, described is a sliding mechanism 20B of a second embodiment of the present invention in which the spring unit 10A is installed. FIGS. 7A and 7B illustrate an electronic apparatus 40B in which the electronic apparatus 40B installing the sliding mechanism 20B of the second embodiment is installed.

Figure 6:
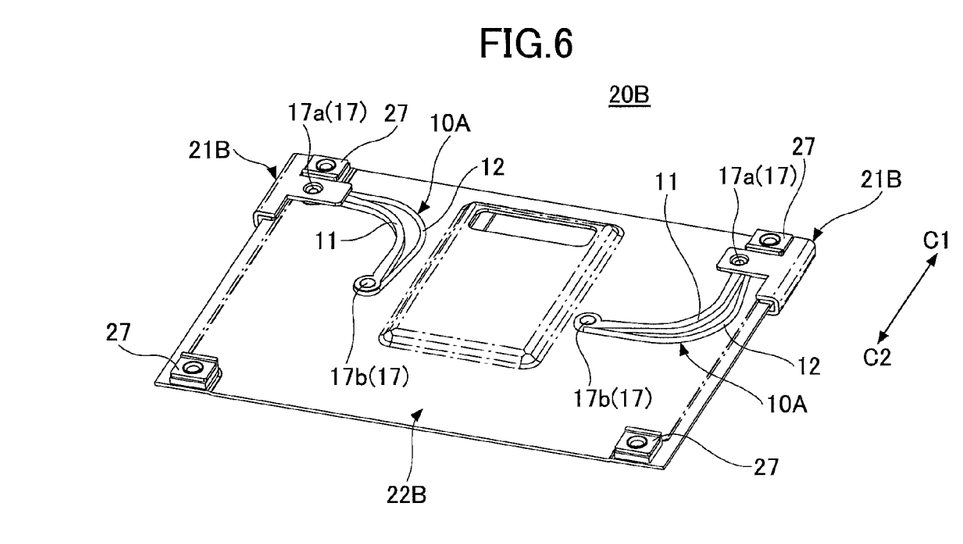
FIG. 6 is a perspective view of a sliding mechanism of a second embodiment.

The sliding mechanism 20A of the first embodiment is structured to include the single spring unit 10A between the base plate 21A and the slide plated 22A. Meanwhile, the sliding mechanism 20B of the second embodiment is characterized in that multiple spring units 10A are arranged between the base plate 21B and the slide plate 22B.

The sliding mechanism 20B of the second embodiment is structured to arrange two spring units 10A on both sides of the slide plate 22B, respectively. At this time, as illustrated in FIG. 6, a pair of spring units 10A may be symmetrically arranged as illustrated in FIG. 6.

By arranging as such, the curved parts 11a and 12a of one of the spring units 10A are positioned on a side of the direction C1, and the curved parts 11a and 12a of the other one of the spring units 10A are positioned on a side of the direction C2. With this, in comparison with a case where the slide plate 22B slides from the opened state to the closed state and a case where the slide plate 22B slides from the closed state to the opened state when the slide plate 22B slides relative to the base plate 21B, the elastic forces generated by the spring units 10A become uniform to enable a stable slide motion without a rickety motion.

Figure 8:
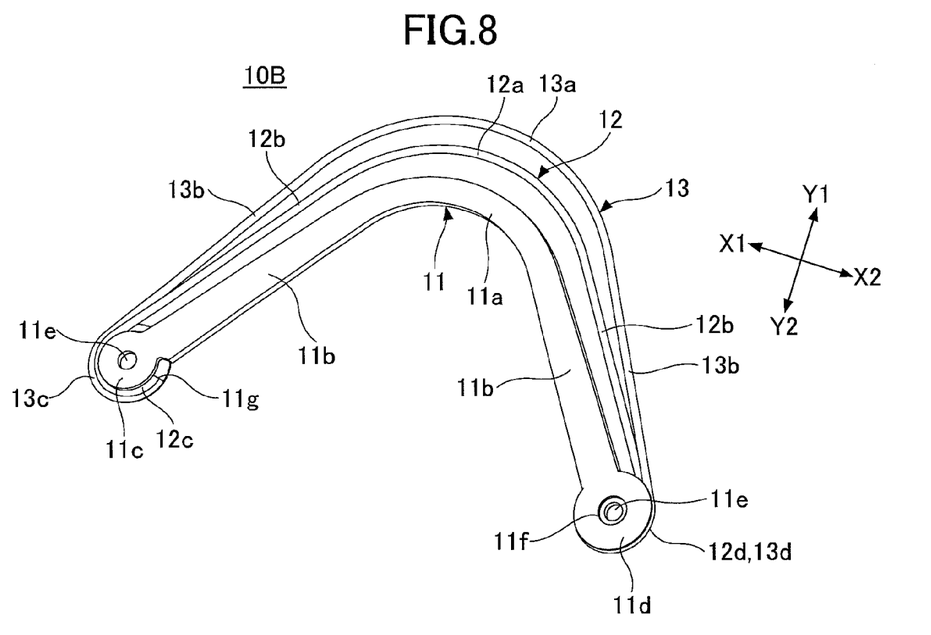
FIG. 8 is a perspective view of a spring unit of a second embodiment.
Figure 9:
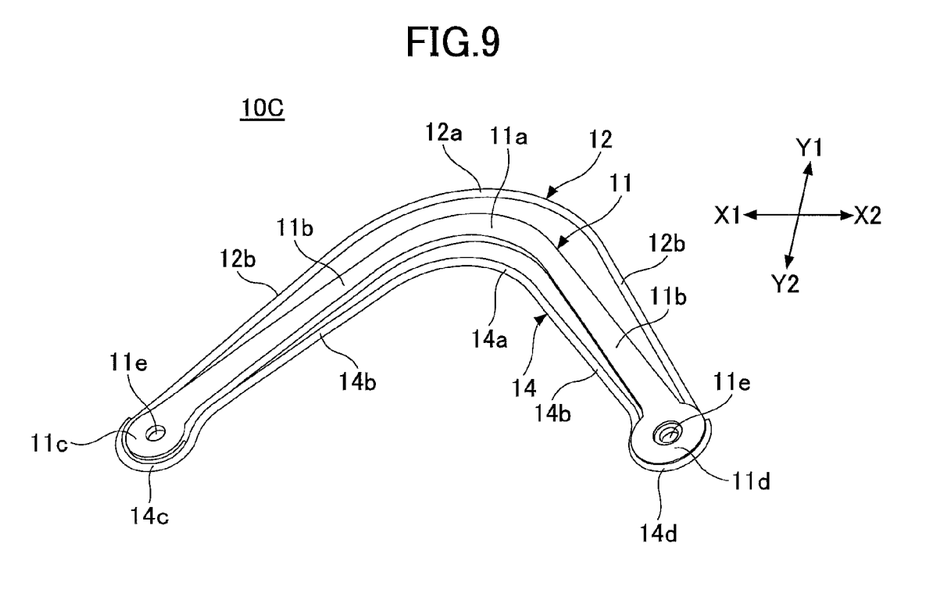
FIG. 9 is a perspective view of a spring unit of a third embodiment.
Figure 10:
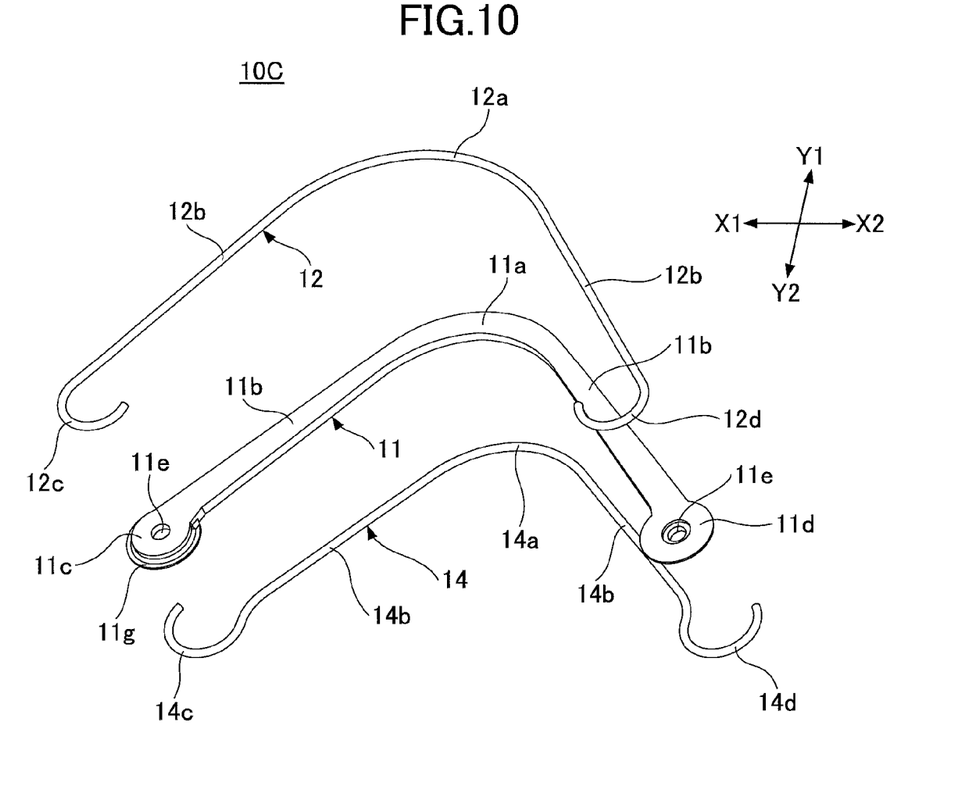
FIG. 10 is an exploded perspective view of a spring unit of a third embodiment.

FIGS. 8-10 illustrate the spring units 10B and 10C of the second and third embodiments.

The spring unit 10A of the first embodiment has the structure of including one resin spring 11 and one metallic spring 12. Meanwhile, the spring units 10B and 100 of the second and third embodiments are characterized in that multiple metallic springs 12, 13, and 14 are provided with the one resin spring 11.

FIG. 8 illustrates the spring unit 10B of the second embodiment. The spring unit 10B of the second embodiment is characterized in that provided that a side of the resin spring 12 where tips of the end parts 12c and 13c and tips of the end parts 12d and 13d of the metallic springs 12 and 13 face the corresponding end parts 11c and 1id of the resin spring 11 is called an inside, the metallic springs 12 and 13 are arranged on the outside of the resin spring 11. Said differently, the metallic springs 12 and 13 are arranged on the side of the direction Y1 of the resin spring 11.

One end part 12c of the metallic spring 12 and one end part 13c of the metallic spring 13 are attached to the attaching flanges 11g formed in one end part 11c so as to be winded around the attaching flange 11g. The other end part 12d of the metallic spring 12 and the other end part 13d of the metallic spring 13 are attached to the attaching flanges 11g formed in the other end part 11d so as to be winded around the attaching flange 11g. Further, in a state where the end parts 12c and 13c of the metallic springs 12 and 13 are attached to the end parts 11c and 11d of the resin spring 11, a separating space between the resin spring 11 and the metallic spring 12 close to the resin spring 11 and a separating space between the metallic springs 12 and 13 are structured to be maintained except for the end parts 11c, 12c, 13c, lid, 12d, and 13d. Therefore, in a case where the spring unit 10B is driven, the springs 11, 12, and 13 may not mutually interfere.

As described in the second embodiment, the number of the metallic springs provided in the resin spring 11 is not limited to one. Multiple metallic springs 12 and 13 may be provided in the resin spring 11. As described, by adjusting the number of the metallic springs provided in the resin spring 11, the spring property of the spring unit 10B can be adjusted.

FIGS. 9 and 10 illustrate a spring unit 100 of the third embodiment. FIG. 9 is a perspective view of the spring unit 100. FIG. 10 is an exploded perspective view of the spring unit 100. The spring unit 100 of the third embodiment is characterized in that metallic springs 12 and 14 are provided inside and outside the resin spring 11, respectively.

Provided that a side of the resin spring 11 where tips of end parts 12c and 12d of the metallic spring 12 face end parts 11c and 11d of the resin spring 11 is called an inside, the metallic spring 12 is arranged on an outside of the resin spring 11 opposite to the inside, and the metallic spring 14 is arranged inside the metallic spring 12. Said differently, the metallic spring 12 is arranged on a side of the direction Y1 of the resin spring 11, and the metallic spring 14 is arranged on a side of the direction Y2 of the resin spring 11.

The position of arranging the metallic spring is not limited to the outside of the resin spring 11 and may be arranged inside the resin spring 11. Further, the metallic springs may be arranged on both of the inside and the outside of the resin spring 11. The position and the number of providing the metallic springs in the resin spring 11 may be appropriately selected depending on a spring property required for the spring unit 100.

Within the spring units 10B and 100 of the second and third embodiments, the two metallic springs 12 and 13 or the two metallic springs 12 and 14 are provided in the single resin spring 11. However, the number of providing the metallic springs is not limited to this and may be 3 or greater.

Although the spring unit has been described with respect to embodiments, the appended claims are not to be thus limited but are to be construed as embodying various modifications and alternative constructions within the scope of the present invention.

This international application is based on Japanese Priority Patent Application No. 2012-018742 filed on Jan. 31, 2012, the entire contents of Japanese Priority Patent Application No. 2012-018742 are hereby incorporated herein by reference.

EXPLANATION OF REFERENCE SIGNS

10A, 10B, 10C: spring unit;
11: resin spring;
12, 13, 14: metallic spring;
11a, 12a, 13a, 14a: curved part;
11b, 12b, 13b, 14b: extending part;
11c, 11d, 12c, 12d, 13c, 13d, 14c, 14d: end part;
11e: pin insertion hole;
11f: step for pin;
11g: attaching flange;
17, 17a, 17b: pin;
20A, 20B: sliding mechanism;
21A, 21B: base plate;
22A, 22B: slide plate;
40A, 40B: electronic apparatus;
41A, 42A: first casing; and
41B, 42B: second casing.

The invention claimed is:

1. A spring unit comprising:
a resin spring that is made of a resin, has a structure having a single beam, and includes a pair of resin spring end parts and a resin spring curved part between the pair of resin spring end parts,
each of the resin spring end parts including a pin insertion hole opened through each of the resin spring end parts and an attaching flange formed at an outer peripheral position of each of the resin spring end parts,
the pin insertion hole including a step corresponding to a pin that includes two different outer diameters and is to be substantially embedded in the pin insertion hole, and
the attaching flange being shaped like a ring whose center is at a center position of the pin insertion hole; and
a metallic spring that is made of a metallic wire and has a metallic spring curved part between a pair of metallic spring end parts,
wherein each of the metallic spring end parts is attached to each of the resin spring end parts so that the metallic spring end parts are wound around the corresponding attaching flange of the resin spring,
wherein, in a state where each of the metallic spring end parts is attached to each of the resin spring end parts, the resin spring and the metallic spring are positioned on a same plane and are mutually separated at parts other than the resin spring end parts and the metallic spring end parts.

2. The spring unit according to claim 1,
wherein the metallic spring includes a plurality of metallic springs.

3. The spring unit according to claim 2,
wherein, provided that a side of the resin spring where tips of the pair of metallic spring end parts face the pair of resin spring end parts is called an inside, the metallic springs are arranged on the inside of the resin spring and an outside opposite to the inside of the resin spring.

4. The spring unit according to claim 1,
wherein, provided that a side of the resin spring where tips of the pair of metallic spring end parts face the pair of resin spring end parts is called an inside, the metallic spring is arranged on an outside opposite to the inside of the resin spring.

5. The spring unit according to claim 1,
wherein a diameter of the metallic spring is set to be smaller than a thickness of the resin spring.

6. A sliding mechanism comprising:
a base plate;
a slide plate attached to the base plate so as to be slidable relative to the base plate; and
a spring unit according to claim 1,
wherein the spring unit is arranged between the base plate and the slide plate and urges the slide plate in a sliding direction relative to the base plate.

* * * * *